Sept. 22, 1931. E. F. MITCHELL 1,824,225
METHOD OF PACKING LIVESTOCK FOR CONVEYANCE IN TRANSPORT VEHICLES
Filed July 17, 1928 5 Sheets-Sheet 1

Inventor
E. F. Mitchell

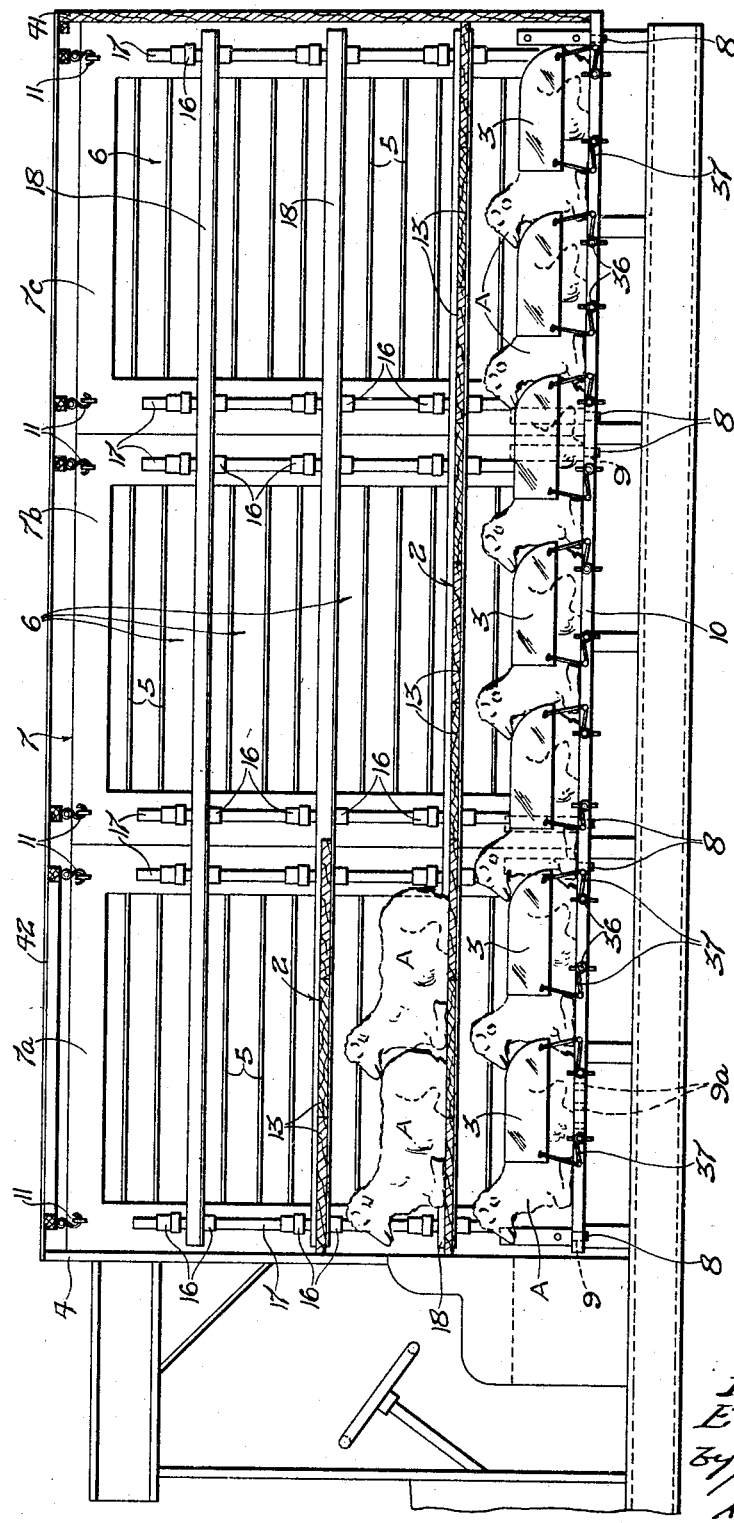

Sept. 22, 1931.   E. F. MITCHELL   1,824,225
METHOD OF PACKING LIVESTOCK FOR CONVEYANCE IN TRANSPORT VEHICLES
Filed July 17, 1928   5 Sheets-Sheet 3
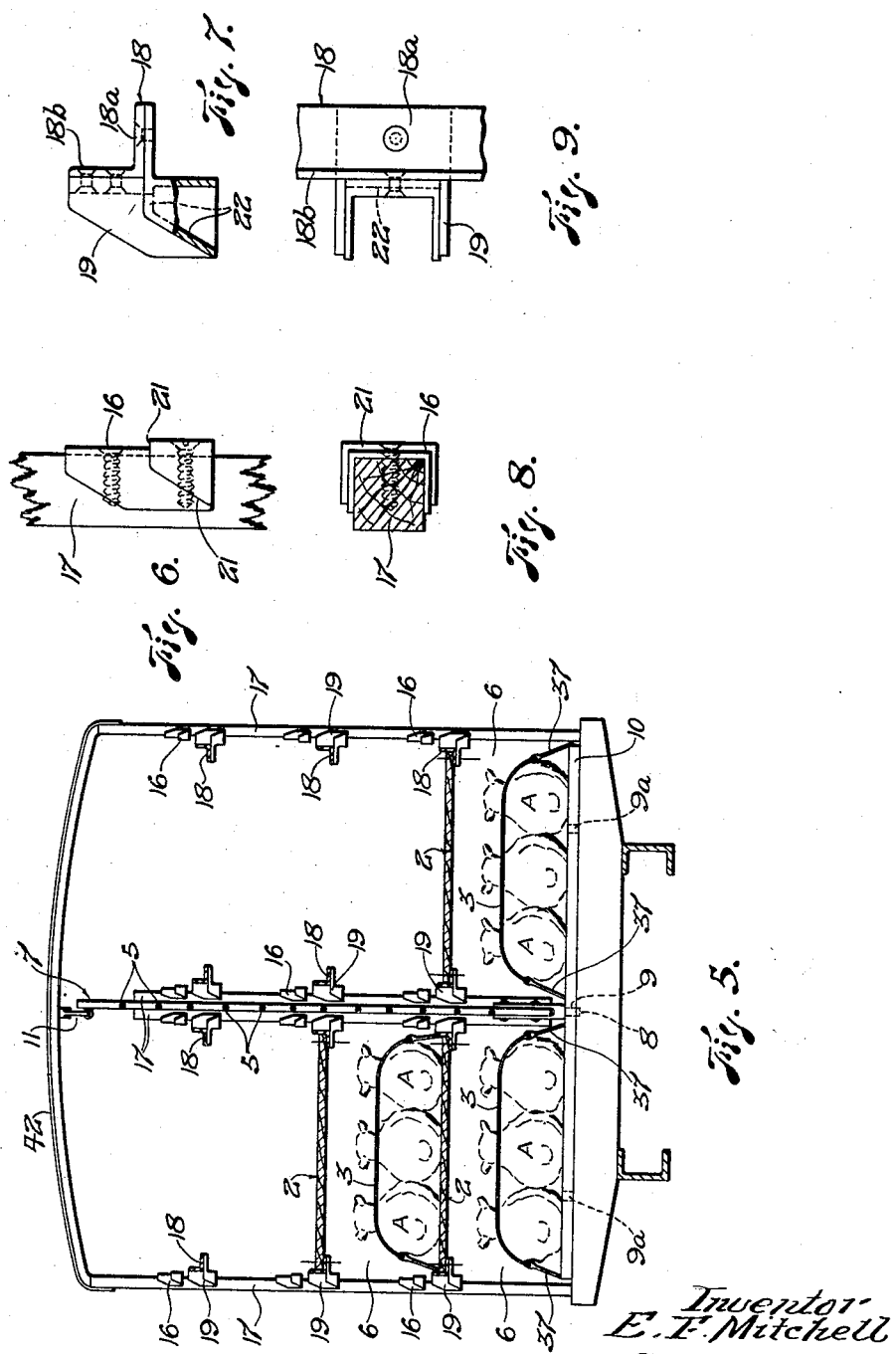

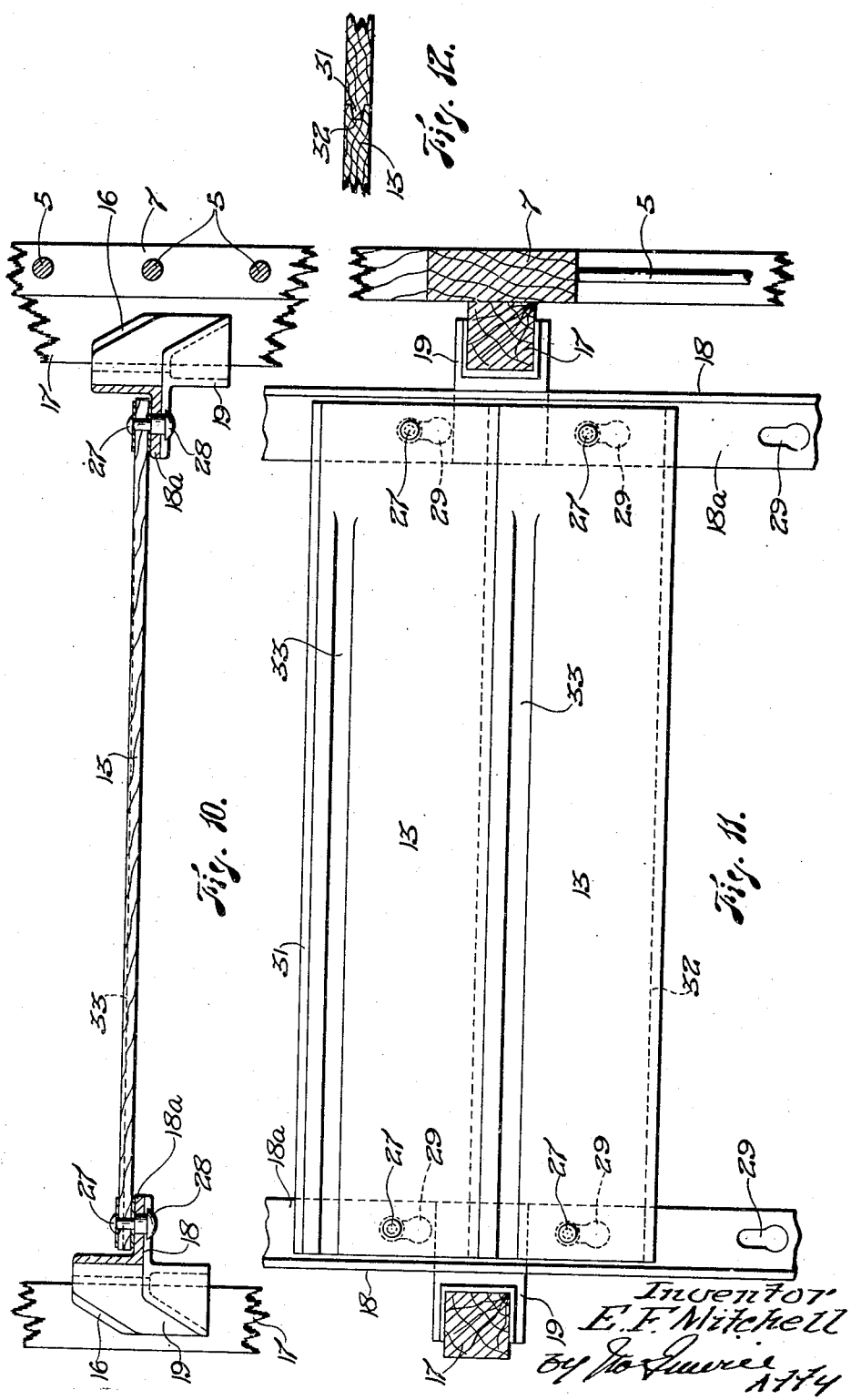

Sept. 22, 1931.   E. F. MITCHELL   1,824,225
METHOD OF PACKING LIVESTOCK FOR CONVEYANCE IN TRANSPORT VEHICLES
Filed July 17, 1928   5 Sheets-Sheet 5
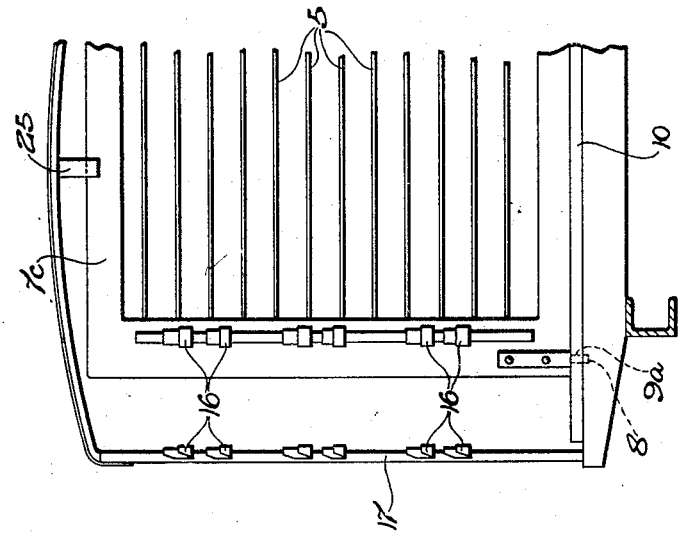
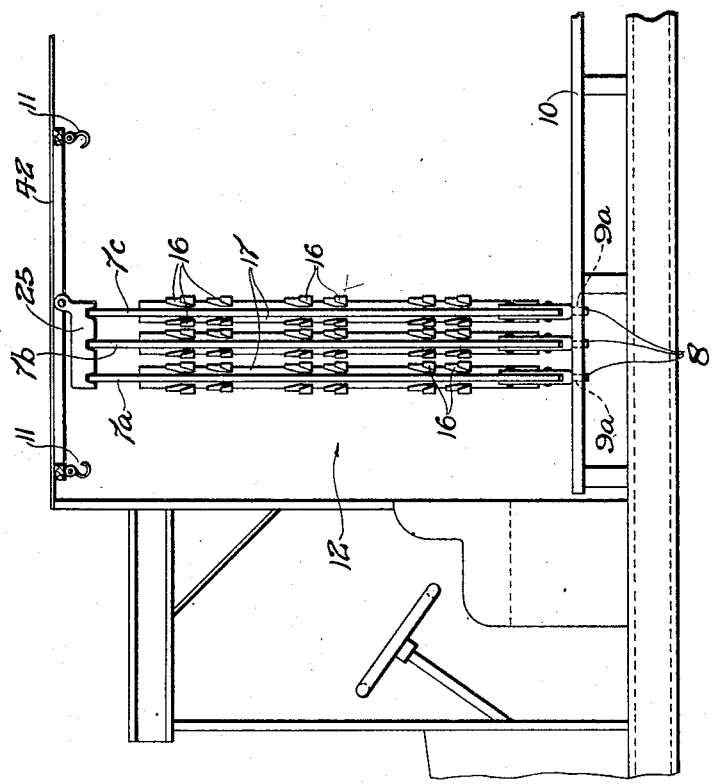
Inventor
E. F. Mitchell Patented Sept. 22, 1931

1,824,225

UNITED STATES PATENT OFFICE

EDWARD FANCOURT MITCHELL, OF MELBOURNE, AUSTRALIA

METHOD OF PACKING LIVESTOCK FOR CONVEYANCE IN TRANSPORT VEHICLES

Application filed July 17, 1928, Serial No. 293,471, and in Australia August 19, 1927.

This invention relates to the transportation of livestock and more particularly to the transportation of such animals as sheep, lambs and other livestock of a size suitable for convenient handling, in motor vehicles, railway trucks and other vehicles of a kind suitable for carrying such livestock in considerable numbers.

The transportation of such livestock in motor and railway vehicles is, at present, subject to disadvantages and disabilities. The established practice is to carry the livestock in a normal standing position, the vehicles being usually provided with two floors for the animals to stand upon. It has been found that under these conditions only comparatively limited numbers of sheep, for example, can be accommodated in each vehicle, which renders transportation, in some cases so costly as to be commercially impracticable. Another disadvantage is that jolts and jars experienced during transit, the shunting of trucks, and the swaying or sudden changes of speed and stoppage of the transport vehicles, frequently cause the animals to be thrown down and trampled upon by their companions, and in this and other ways bruised or otherwise injured, more particularly in cases where jolts are received when the transport vehicle is travelling up and down relatively steep inclines.

Furthermore, where sheep with good wool have been carried in an unprotected condition over dusty roads, or country, the value of the wool of the animals is sometimes deteriorated by the impurities so gathered.

A still further objection to the previous attempts to transport livestock by motor vehicles is that it has proved difficult to water or feed the stock whilst in transit on long journeys without unloading.

The present invention is the result of considerable time and thought devoted to the economical transportation of livestock under commercial and humane conditions and as the result of research and experiments and is primarily directed to a method for packing livestock for conveyance in transport vehicles, whereby the disadvantages before referred to are reduced to a minimum.

The practising of the present invention enables livestock to be transported expeditiously, economically, in a humane manner and reduces the likelihood of the stock being injured or losing condition.

The essential feature of the present invention resides in the novel manner of arranging or packing the livestock in a semi-recumbent or couchant position, (as will be more fully referred to thereinafter, and such as the stock sometimes assume when resting under natural conditions) in closely spaced rows upon the decks of a transport vehicle and applying retaining devices for maintaining the stock in such position.

By packing and retaining the stock in the manner indicated the possibility of injuries, damage or hardships experienced under prevailing conditions, according to which the stock is carried in standing positions, or in a manner under which the animals may move, or be moved, about is eliminated or at least minimized.

A further, and a very important advantage arising from the improved method or mode of packing according to the present invention is that the distance between the superposed decks of the transport vehicle is considerably reduced thus enabling a greater number of decks or tiers to be provided and the centre of gravity of the loaded vehicle kept as low as possible, thereby rendering the vehicle less likely to sway and more suitable for traffic. The invention thus permits an increased number of livestock to be carried by such vehicle and thereby considerably reduces the cost per head of the stock transported.

The devices contemplated for retaining the livestock in a recumbent or couchant position are simple and inexpensive, easy to apply, and efficient in action and may also, if so desired, be of such form as to afford protection to sheep or lambs during transportation from extreme variations of cold and heat and also from dust.

The invention also contemplates the provision in a transport vehicle of simple and effective means adapted to permit the improved mode of packing to be carried out with rapidity and ease, and to enable the body of the vehicle to be speedily converted for the carriage of other loads, when, and if so desired.

The above and other objects of the invention and the numerous advantages arising therefrom will be more readily appreciated from the following description and the accompanying drawings which illustrate a preferred mode of carrying the invention into practical effect.

It is, however, to be understood that the invention is capable of varied applications and in its widest aspect is to be construed as including the use of any suitable means for securing and transporting animals in considerable numbers packed and retained in a recumbent or couchant position.

In the drawings Figure 1 represents a side view of a sheep arranged in the recumbent or couchant attitude in which it is packed and retained in accordance with the invention.

Figure 4 is a fragmentary side view of a motor vehicle having a body equipped with devices to facilitate the packing and securing of livestock therein in accordance with this invention.

Figure 5 is an end view of Figure 4.

Figure 6 is a side view of one of a series of male cleats or brackets which form part of the deck supporting means in accordance with the invention.

Figure 7 is a side view of one of a series of female cleats adapted to co-act with a male cleat as seen in Figure 6 and to support a deck rail.

Figure 8 is a plan of Figure 6.

Figure 9 is a plan of Figure 7.

Figure 10 is a part sectional view of a deck and supporting means therefor, in accordance with the invention.

Figure 11 is a plan of Figure 10.

Figure 12 is a fragmentary section of planks of which dismountable decks in accordance with this invention are composed and illustrates a tongue and groove connection for said planks.

Figure 13 is a fragmentary side view of the vehicle body and showing a partition.

Figure 14 is a fragmentary rear view of Figure 13.

Figure 1:
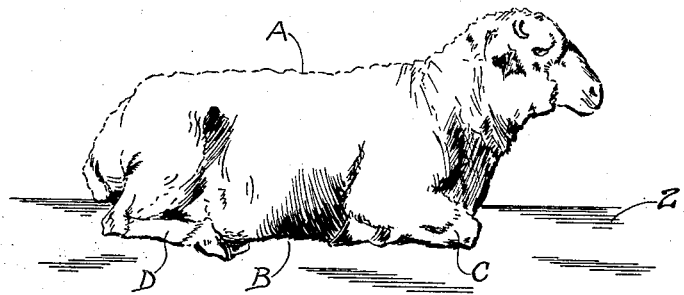

The recumbent or couchant position in which livestock is to be packed or arranged in a transport vehicle is depicted in Figure 1 which illustrates a sheep A having its belly B resting upon a deck or floor 2. A portion of the chest also rests upon the floor with the fore part of the chest erect. The forelegs C are bent backwards from the knees in a natural manner and also rest upon the deck at the front of the body, whilst the hind part of the animal is preferably slightly inclined to one side in such a manner that one hind leg D extends naturally forwards clear of the body and the other hind leg lies beneath the body. The position described is natural and comfortable and animals may be readily arranged in this position by persons accustomed to handling sheep.

Figure 2:
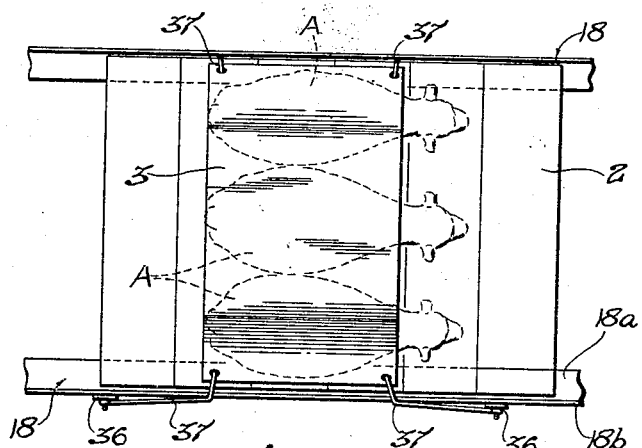
Figure 2 is a somewhat diagrammatic plan view of a number of sheep packed or arranged in a row and illustrating suitable means for retaining them in such position during transport, in accordance with this invention.
Figure 3:
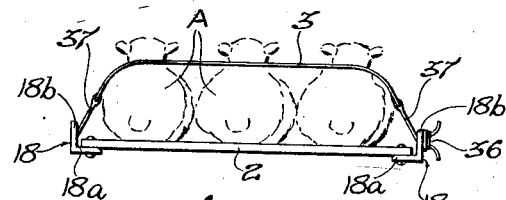
Figure 3 is a rear view of a number of sheep arranged and secured in position for transport, in accordance with this invention.

The animals are arranged in rows which preferably extend transversely of the vehicle, as seen in Figures 2, 3 and 5, the packing being carried out one row at a time, the foremost row being preferably the first to be arranged.

When the animals in the foremost row have been arranged, an apron or a retaining device 3, hereinafter described, is applied over the backs of the animals so as to restrain them from rising and to retain them in the desired position during transport, but leaving the animals free to move their heads. To ensure that the animals remain in the couchant position pending the application of the aprons or retainers, the legs of the animals may be temporarily tied, but such leg tying is unnecessary if two or three persons accustomed to handling such animals are available to arrange them.

A further row of animals may then be similarly packed and retained in position with their breasts or chests close up to the rear of the animals in the foremost row, and with their heads above the level of the apron or retainer 3 extending over the backs of animals in the row in front as seen in Figure 4. Other animals are then packed and retained in a similar manner in succeeding rows until the whole of the compartment of the vehicle being packed or any desired portion thereof is loaded.

The following description of the loading of a motor vehicle body specially designed by the inventor to carry out his invention in the best way at present known to him will enable the nature and operating of the invention to be more readily understood. It is to be understood however that the invention is not limited in application to motor vehicles. The interior of the vehicle body 4, when it is to be utilized for the carriage of livestock, is preferably divided into stock accommodating compartments 6, preferably by means of one or more vertical longitudinally extending partitions 7 and a number of superposed decks 2 as seen in Figures 4 and 5. The partition or partitions and the decks are preferably adapted to be detachably positioned upon the vehicle in order that they may be removed when, and if, it is required to employ the vehicle for the carriage of different classes of loads.

It is considered that a single partition 7 extending longitudinally and centrally of the vehicle will be adequate under most conditions. The partition may be in one piece if so desired, but is preferably formed of a plurality of sections, for example, three sections 7a, 7b and 7c. The partition sections may be provided at their lower ends with depending pins or bolts 8 adapted to fit into suitable holes or sockets 9 formed in the floor or main deck 10 of the vehicle body. Catches, clips or holding means of any suitable form as indicated, for example, at 11 in Figure 4, may be provided adjacent the top of the body to hold the partition sections in the desired erect position.

The partition sections 7a, 7b, 7c are preferably of such dimensions that when the vehicle is required to transport loads other than livestock, the sections may be dismounted and conveniently carried by the vehicle. For this purpose the main deck 10 of the vehicle may be provided, at transversely spaced intervals behind the driver's seat with a series of additional holes or sockets 9a conveniently spaced to receive the pins or bolts 8 depending from the bottom of the partition sections, in such a manner that when in an inoperative position the sections may be stored vertically contiguous to one another upon the deck, and provide at the front of the vehicle body a space 12 (Figures 13 and 14) in which may be stored the dismounted deck planks 13 and other appurtenances which are not required when the vehicle is used for transporting loads other than livestock. A suitable dog or catch 25 may be provided to hold the partition sections in a transversely extending attitude. By such arrangement only a minimum amount of loading space is taken up by the partition sections, deck boards and other parts, which are also conveniently placed so that they do not in any way obstruct loading or unloading operations.

Provision may, however, be made for storing and carrying such partition sections and deck boards in any other convenient position.

The partition sections 7a, 7b and 7c, and a suitable framework at both sides of the vehicle body may be formed of any suitable material or combination of materials, and have sufficient openings to permit the free access and passage of air through the compartments. For instance, if desired, each partition section may comprise a rectangular frame having a series of suitably spaced bars 5. A similar construction may be adopted for the sides of the vehicle body.

The partition sections and the sides of the body frame are also adapted to provide support for removable decks 2 of which there may be any desired or convenient number. Provision is also preferably made to enable the decks to be disposed at different heights to ensure the free access and passage of air through the compartments, and according to the size of the animals to be transported or to other conditions or requirements. For this purpose a number of male cleats or brackets 16 (see Figures 6 and 8) may be secured in longitudinal rows to uprights or pillars 17 at the side of the vehicle body and at both sides of the partition, as seen in Figure 5. The rows of male cleats may be duplicated and disposed at required altitudes so that the height of each deck may be adjusted as required.

In conjunction with the foregoing, I provide deck supporting members each of which preferably consists of a length of metal or other rail 18 of right angle cross section. Each of the deck supporting rails has secured thereto a series of female cleats or brackets 19 (see Figures 7 and 9) adapted to rest upon or to engage the male cleats or brackets 16 before mentioned.

The male and female brackets are preferably provided with co-acting shoulders 21 (Figures 6 and 8) and recesses 22 (Figures 7 and 9) so formed that they may snugly fit one within the other and thus afford rigid support for the deck supporting rails 18.

The horizontal flange or web 18a of each deck rail projects inwardly into the respective stock compartment 6 and forms a seating for the respective deck. The main deck or bottom 10 of the vehicle body is preferably a fixture but the upper decks 2 are preferably detachable and are built up of a plurality of separate planks or boards 13. When placed in operative position the deck planks rest at opposite ends upon the horizontal webs 18a of the respective deck rails (see Figures 10 and 11) and may be secured thereto by bolts, pins or keepers 27 which may have enlarged heads or shoulders 28, and are adapted to pass into key-hole slots 29 in the rails 18 whereby the planks may be readily fitted in position.

When assembled the planks 13 of each deck may be closely fitted to each other by tongues 31 and grooves 32 (see Figure 12) so as to render the deck as water-proof as possible. The planks may also be provided in their upper surfaces with grooves or drainage channels 33 which extend adjacent the partition 7 and serve to drain the decks of urine.

The retaining devices 3 hereinbefore referred to may each consist of an apron or flexible cover composed of canvas, leather or any other sufficiently strong and suitable material. One of such aprons or covers should be provided for each row of animals in each compartment 6 and each apron should preferably be attached to the partition 7 and to a side of the vehicle body at convenient points below the level of the animals' backs. A convenient member or part to attach each apron 3 is the vertical web 18b of the appropriate deck supporting rail 18 which may be provided with any suitable fittings therefore, as indicated for example at 36 in Figures 2 and 3.

For this purpose each apron 3 may be provided adjacent its corners, and, if desired, at various intermediate positions along the sides thereof with suitable fastening means whereby it may be securely but detachably held in position. Such fastening means may advantageously comprise ropes or cords 37, each fastened at one end to an apron and adapted to be fastened at its other end to a fitting 36 on an adjacent deck rail 18, or, in the case of the lower tier, to a fitting 36 on the main deck 10. If desired eyelets 38 may be provided in the aprons 3 and the deck rails 18 to facilitate the correct positioning and effective fastening of the aprons.

The aprons 3 are applied in such a manner as to extend closely and tautly over the backs of the animals as indicated in the drawings and in instances where sheep or lambs are to be carried particular care should be taken to apply the aprons in such a manner that the hind portions of the animals are securely held down, as such animals in rising from a recumbent or couchant position first elevate their hind portions.

By applying the aprons in the manner indicated, the animals will be effectively prevented from moving from the positions in which they are arranged. In the event of the vehicle body being subjected to jolting or bumping the aprons will prevent the animals in one row from being precipitated onto those of the row next in advance or in rear, and when the vehicle is travelling up or down relatively steep inclines the aprons will tend to minimize the pressure transmitted to the front or rear rows of animals due to the weight of the other animals in the compartment. The aprons will also check dust and other foreign matter from collecting upon or penetrating into the fleeces of sheep and lambs, and to afford greater protection, the aprons or retainers may be provided with flaps or extensions so that the body of each animal may be protected. For use in hot climates the aprons may, if desired, be provided with openings to permit of ventilation of the animals' bodies.

Although I consider that aprons or flexible cover members are most advantageous as retaining means for the sheep it is to be understood that other means may be employed for the purpose indicated. For example, the retaining means may consist of one or more relatively narrow strips or bands of canvas or other suitable material suitably adapted at opposite ends for attachment to the respective deck rails 18 or other convenient parts.

In all instances the means for fastening the retainers to the sides of the vehicle body are preferably accessible from the exterior of the vehicle.

To load a vehicle such as hereinbefore described with sheep or lambs, a compartment 6 at one side of the partition 7 and having the bottom 10 of the vehicle body as its deck may be selected, and each animal of which the front row is to be composed is placed in the semi-recumbent or couchant position as previously mentioned upon the front portion of the body bottom or main deck 10. An apron or retainer 3, which preferably should be previously fastened at its inner side to the partition 7 or a deck rail 18 thereon, should then be quickly applied as aforesaid so as to secure the front row of animals in position. Another row of animals may then be similarly packed upon the main deck immediately in rear of the front row and secured by another apron or retainer 3.

After the first row has, or the first and second rows of animals have been packed and secured upon the lower deck, the decking planks 13 above them should be preferably placed in position and secured to the respective deck rails 18 to form the front portion of the roof or top of that compartment and also of the deck of the next higher tier 2, this procedure being followed, until the whole of that compartment has been loaded with animals which are held in position by the retainers or aprons 3, and its roof or top has been completely built up. The last or rearmost plank 13 to be fitted is preferably adapted to act as a key in such a manner as to keep the other planks securely in position. Additional animals may then be arranged and secured upon the deck of the corresponding compartment at the other side of the partition and its roof or top similarly placed in position, whereupon the next higher compartment at each side of the partition can be packed in the manner indicated and the next roof or top built up, such procedure being carried out until the whole of the superposed decks are loaded.

A suitable door or closure 41 may be provided at the rear of the vehicle body to facilitate loading and unloading operations and to provide a rear closure for the vehicle when in use.

To facilitate the packing of the upper compartments the top or roof 42 of the vehicle body is preferably made movable or displaceable so that it need not be placed in position until loading is completed. Any suitable means may be employed to detachably retain the body top or roof in a closed position. The roof may be advantageously composed of strong canvas or other fabric, tarred or otherwise rendered watertight, and should be firmly attached to a suitable strong framework.

To facilitate loading and unloading of the livestock it may be desirable to provide a suitable ramp or stage.

In order to water and feed the animals without unloading, which may be desirable in instances where they are to be carried over very long distances, water and food can be conveniently placed in suitable troughs or receptacles adapted to be inserted sidewardly into the various compartments so as to extend transversely adjacent the heads of the transverse rows of animals.

Owing to the upper decks and the partition being dismountable, it will be evident that practically the whole of the interior of the vehicle body can be utilized when so desired for carrying any kind of load and also for carrying large cattle, horses and other livestock in a standing up position. When carrying race horses and other comparatively large and valuable animals the partition 7 is preferably left in position.

The main advantages of the invention are—

That in times of drought, when stock routes are bare of feed and/or water, so that the ordinary droving of sheep is impracticable and no railways exist within a reasonable distance connected with the desired destination of the stock, the invention enables sheep and lambs to be speedily and effectively carried in motor vehicles, designed and fitted as hereinbefore described, in large numbers and at reasonable costs to the desired destination or to some railway which is connected with that destination.

Also, the method of carrying in a natural recumbent position can be adapted to stock trucks on railways if suitable modifications of, and additions to, existing trucks are made, as previously mentioned, or if in the case of new trucks, the necessary provisions are made; and if applied would enable much larger numbers of sheep or lambs to be carried in a truck than at present. Other livestock, such for instance as fat calves, could be arranged and secured in a semi-recumbent or couchant position for transport in vehicles in accordance with the invention.

Having now described my invention what I claim as new and desire to secure by Letters Patent is:

1. A method of packing livestock for vehicular conveyance consisting in arranging the animals in substantially couchant attitudes in rows extending longitudinally and transversely of the vehicle, and simultaneously confining in such couchant attitudes a plurality of the animals of each transverse row, with each group of confined animals repeated throughout each vertical row.

2. A method of packing livestock for conveyance in transport vehicles consisting in arranging the animals in couchant attitudes in groups including a plurality of animals, a successive number of groups being arranged transversely and longitudinally of the vehicle, and simultaneously confining each group in their couchant attitudes whereby all the animals of one group are held in their couchant attitudes independently of the animals of any other group and may be released together independently of any of the other animals.

In testimony whereof I affix my signature.

EDWARD FANCOURT MITCHELL.